(12) United States Patent
Lin et al.

(10) Patent No.: US 8,813,597 B2
(45) Date of Patent: Aug. 26, 2014

(54) RETURN STRUCTURE FOR A BALL SCREW WITH A CHAIN TYPE ROLLING ASSEMBLY

(75) Inventors: Ming-Yao Lin, Taichung (TW); Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 583 days.

(21) Appl. No.: 13/172,724

(22) Filed: Jun. 29, 2011

(65) Prior Publication Data

US 2011/0252908 A1 Oct. 20, 2011

Related U.S. Application Data

(63) Continuation-in-part of application No. 12/340,734, filed on Dec. 21, 2008, now abandoned.

(30) Foreign Application Priority Data

Nov. 14, 2008 (TW) .............................. 97144113 A

(51) Int. Cl.
*F16H 25/22* (2006.01)
(52) U.S. Cl.
CPC ........ *F16H 25/2219* (2013.01); *F16H 25/2238* (2013.01)
USPC .................................. 74/424.86; 74/424.88
(58) Field of Classification Search
CPC ..................... F16H 25/2219; F16H 25/2238
USPC .............................. 74/424.82–424.87, 424.88
See application file for complete search history.

*Primary Examiner* — David M Fenstermacher
*Assistant Examiner* — Terence Boes
(74) *Attorney, Agent, or Firm* — Banger Shia

(57) ABSTRACT

A ball screw comprises a screw, a nut, two return assemblies and a rolling assembly. The two return assemblies are disposed in two ends of the nut, and each of the return assemblies is defined with a return passage provided with two guiding grooves at two sides thereof for guiding the linking portions of the rolling assembly. The guiding grooves twist an angle of about 90 degrees within the return portion of each of the return assemblies to prevent the linking portions from being stretched or extruded improperly to reduce the deformation to the lowest, thus effectively extending the service life of the rolling assembly.

3 Claims, 14 Drawing Sheets

RETURN STRUCTURE FOR A BALL SCREW WITH A CHAIN TYPE ROLLING ASSEMBLY

This application is a continuation of part of U.S. patent application Ser. No. 12/340,734 filled Dec. 21, 2008, now abandoned.

BACKGROUND OF THE INVENTION

1. Field of the Invention

The present invention relates to a ball screw applied for linear transmission, and more particularly to a return structure for a ball screw with a chain type rolling assembly.

2. Description of the Prior Art

As for precision machineries, in order to control the feed rate precisely and with low friction coefficient, ball screws are used for precision transmission. Such a ball screw is normally provided with a screw, a nut and plural balls between the screw and the nut. The balls roll circularly within the nut through return assemblies provided on the nut. Referring to FIG. 9, a nut 51 is moveably mounted on a screw 50 and provided with a return assembly 52 at each of two opposite ends thereof. The screw 50, the nut 51 and the return assemblies 52 define a circulation path 54 for endless circulation of a rolling assembly 55. In order to avoid undesired rotation of the rolling assembly 55, the circulation path 54 is defined with guiding grooves 541. The rolling assembly 55 is provided with two linking portions 551 at two opposite sides thereof for linking plural rolling elements 550 together. The linking portions 551 slide along the guiding grooves 541 of the circulation path 54, and the guiding grooves 541 at the two sides of the respective return assemblies 52 are disposed along the arcs defined by the smallest radius and the biggest radius of a return portion 520, so that when the rolling assembly 55 passes through the return portion 520, the linking portions 551 at the two sides of the rolling assembly 55 will slide along the guiding grooves at the two sides of the return assembly 52 and bend therein, the direction in which the linking portions 551 bend is obviously vertical to the bendable direction of the linking portions 551, thus causing serious damage to the linking portions 551.

After entering one of the return assemblies 52, the linking portions 551 will move along the guiding grooves 541 at the two sides of the one of the return assemblies 52 and pass through the right-angled return portion 520 of the one of the return assemblies 52 and then pass through the right-angled return portion 520 of the other of the return assemblies 52 and finally return between the screw 50 and the nut 51. When passing the right-angled return portion 520, the linking portions 551 at the two sides of the rolling assembly 50 are located within the arcs defined by the smallest radius and biggest radius of the return portion 520, namely one of the linking portions 551 is located within the arc defined by the biggest radius of the return portion 520 and subject to an improper stretching force, and the other of the linking portions 551 is located within the arc defined by the smallest radius of the return portion 520 and subject to an improper extrusion force. Due to the design of the linking portions 551 of the rolling assembly 55, the bendable direction of the rolling assembly 55 is located at a side where no linking portions 551 are disposed. The direction in which the guiding grooves 541 at the two sides of each of the return assemblies 52 guide the linking portions to bend is located on the linking portions at the two sides of the rolling assembly 55, so that when passing the respective return portions 520, one of the linking portions 551 will be improperly stretched, and meanwhile the other of the linking portions 551 will be extruded.

As a result, the linking portions 551 of the rolling assembly 55 are more likely to rupture due to being improperly stretched or extruded.

When the linking portions 551 at the two sides of the rolling assembly 55 are improperly stretched and extruded synchronously within the return portion 520, they slide at very high speed, and the rolling elements 550 which change the moving direction quickly when entering the return portion 520 are likely to collide with the inner surface of the return assembly 52 to cause vibration. Therefore, when passing the return portion 520, the rolling assembly 55 will be affected by the vibration of the rolling elements 550 or the pulling force between the rolling elements 550, in addition, the rolling assembly 50 is more likely to rupture immediately since the linking portions 551 at the two sides of the rolling assembly 55 are improperly or excessively stretched or extruded. Moreover, since the linking portions 551 at the two sides of the rolling assembly 55 are stretched or extruded synchronously, the rolling elements 550 will deviate from its original path, thus causing undesired friction which will make the circulation of the rolling assembly unsmooth. Additionally, the improper collision will cause noise.

Another conventional chain-type ball screw is shown in FIGS. 10-12, wherein the tubular return member 3 is mounted on the radial outer surface of the nut 2 and comprises two engaging members 15 and a connecting member 16 connecting the two engaging members 15. In the tubular member 3 are formed two guiding grooves 17 for guiding the movement of the linking portion of the chain of the rolling assembly (not shown). The engaging members 15 are elliptical and used to connect the helical rolling groove (not shown) of the nut 2. The abovementioned problems that "the linking portions at the two sides of the rolling assembly are stretched or extruded synchronously, the rolling elements will deviate from its original path, causing undesired friction which will lead to unsmooth circulation of the rolling assembly" is still not solved by this conventional return member 3 due to the fact that the guiding grooves 17 in the engaging members 15 are twisted a predetermined angle though, the guiding grooves 17 in the connecting member 16 are not twisted, and importantly, the guiding groove 17 in the connecting member 16 are just located at the right-angled return portion of the circulation path where the linking portion of the chain of the rolling assembly will be subjected to an improper extrusion force and stretching force, respectively. On top of that, the nut 2 must be elliptical in order to form a flat mounting surface for mounting the return member 3, further, the return member 3 is also elliptical and mounted on the radial outer surface of the nut instead of inside the nut 2, which requires more installation space and the return member 3 is more likely to be damaged by external forces.

The present invention has arisen to mitigate and/or obviate the afore-described disadvantages.

SUMMARY OF THE INVENTION

The technical problems to be solved:

When the rolling assembly which rolls within the conventional ball screw passes through the right-angled return portion of the return assembly, the linking portions of the rolling assembly will slide along the arc routes defined by the smallest radius and the biggest radius of the return portion, so that the rolling assembly is likely to rupture due to the excessive deformation of the linking portions within the return portion, and the improper deformation of the linking portions will greatly increase the friction between the rolling assembly and the return assemblies to cause the unsmooth circulation of the rolling assembly and noise.

In order to solve the above technical problems, the present invention provides a ball screw. The ball screw in accordance with the present invention comprises a screw, a nut, two return assemblies and a rolling assembly. The screw is provided with a screw helical rolling groove and a screw thread, and the nut is provided with a nut helical rolling groove opposite the screw helical rolling groove and a nut thread opposite to the screw thread. The screw rolling groove cooperates with the nut rolling groove to define a loaded path. The nut is provided with a receiving groove in each of two opposite ends thereof for accommodation of the return assemblies. Each of the return assemblies is provided with a linking portion, a return portion and a connecting portion in order and further defined with a linking portion passage, a return portion passage and a connecting portion passage in the linking portion, the return portion and the connecting portion, respectively, wherein the linking portion passage is linked up with the loaded path, and both ends of the return portion passage are connected to the linking portion passage and the connecting portion passage, thus defining a return passage, the other end of the connecting portion passage is connected to the other return assembly through the rolling passage, each of the linking portion passage, the return portion passage and the connecting portion passage is defined with two guiding grooves in the return passage. The rolling assembly includes a chain having plural rolling elements. The chain includes two linking portions at two sides thereof. When the rolling assembly moves from the loaded path to the return portion passage, the linking portions of the chain will be guided by the guiding grooves of the linking portion passage to move and twist a first angle of about 90 degrees.

There is a second angle between two ends of the guiding grooves of the connecting portion passage of each of the return assemblies, and the second angle is about half of the first angular difference. The direction where the guiding grooves of the connection portion passage twist is opposite to the direction where the guiding grooves of the linking portion passage. Due to the twisting of the connecting portions of the two return assemblies, before arriving at the return portion passage of the other return assembly, the linking portions of the rolling assembly has been guided to bend in the bendable direction to avoid the improper deformation. After passing the return portion passage, the linking portions of the rolling assembly will twist an angle of about 90 degrees within the sequent linking portion passage and then enter the loaded path smoothly.

As compared to the conventional technology, the present invention has the following advantages:

1. Avoiding improper bending failure: when the rolling assembly is rolling within the circulation path defined by the screw, the nut and the two return assemblies, the rolling assembly will twist the first angle within the linking portion passage of the return passage of one of the return assemblies through the guiding of the guiding grooves, and then the rolling assembly will bend in the bendable direction to smoothly pass through the return portion passage, thus avoiding the serious deformation to avoid improper bending failure.

2. Reducing interference and improper collision: since the guiding grooves of the return portion passage is provided to make the rolling assembly avoid passing the arc routes defined by the smallest and biggest radius of the return portion passage, the linking portions of the rolling assembly can bend in the bendable direction, therefore, the linking portions at the two sides of the rolling assembly will share the load evenly to be synchronously stretched and extruded, thus avoiding the improper deformation of the overall rolling assembly, and the rolling elements will be kept rolling along the optimal path, thus avoiding the improper collision and interference with the return passage and the return elements to reduce the integral damage and the noise to the lowest.

3. Continuous guiding to form a complete recirculation: besides the above guiding design, the rolling assembly further utilizes the first angle design and the second angle design to twist within the two return assemblies to make the linking portions to bend in the bendable direction to avoid bending excessively within the serious deformation zone, thus forming a complete recirculation path to reduce the interference to the lowest for making the rolling assembly roll within the return passage more smoothly.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
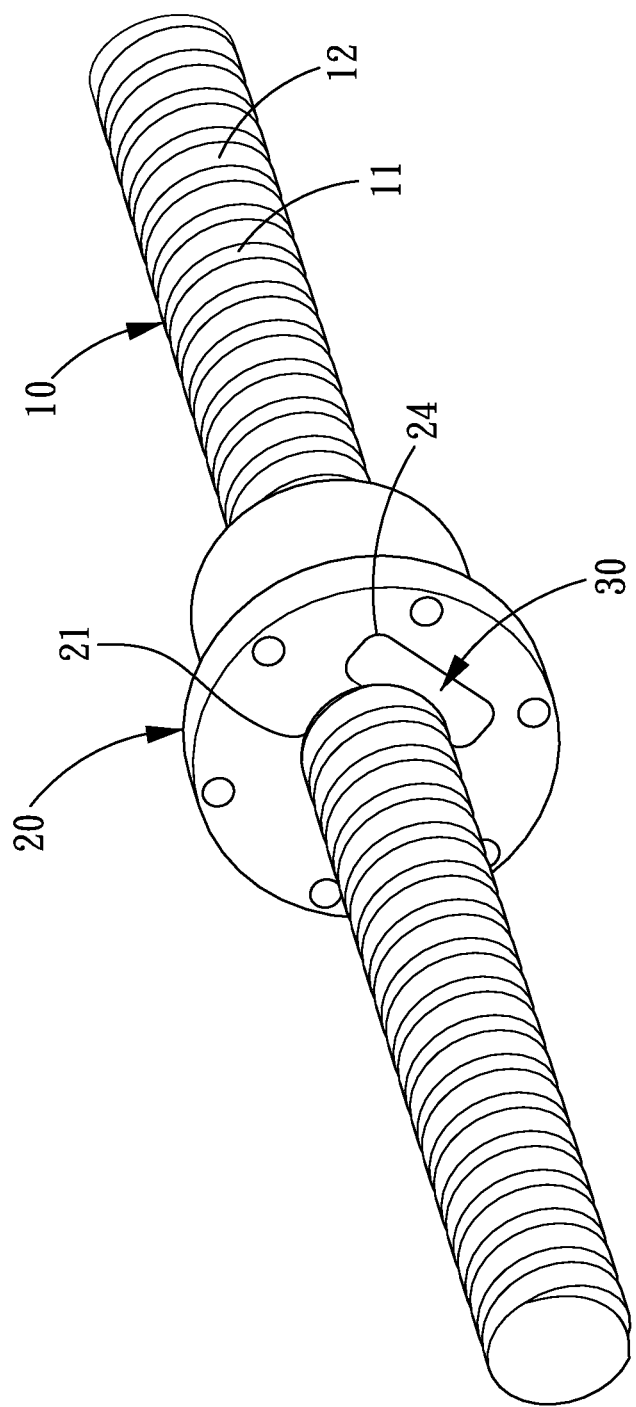
FIG. 1 is a perspective view of a ball screw in accordance with the present invention.
Figure 2:
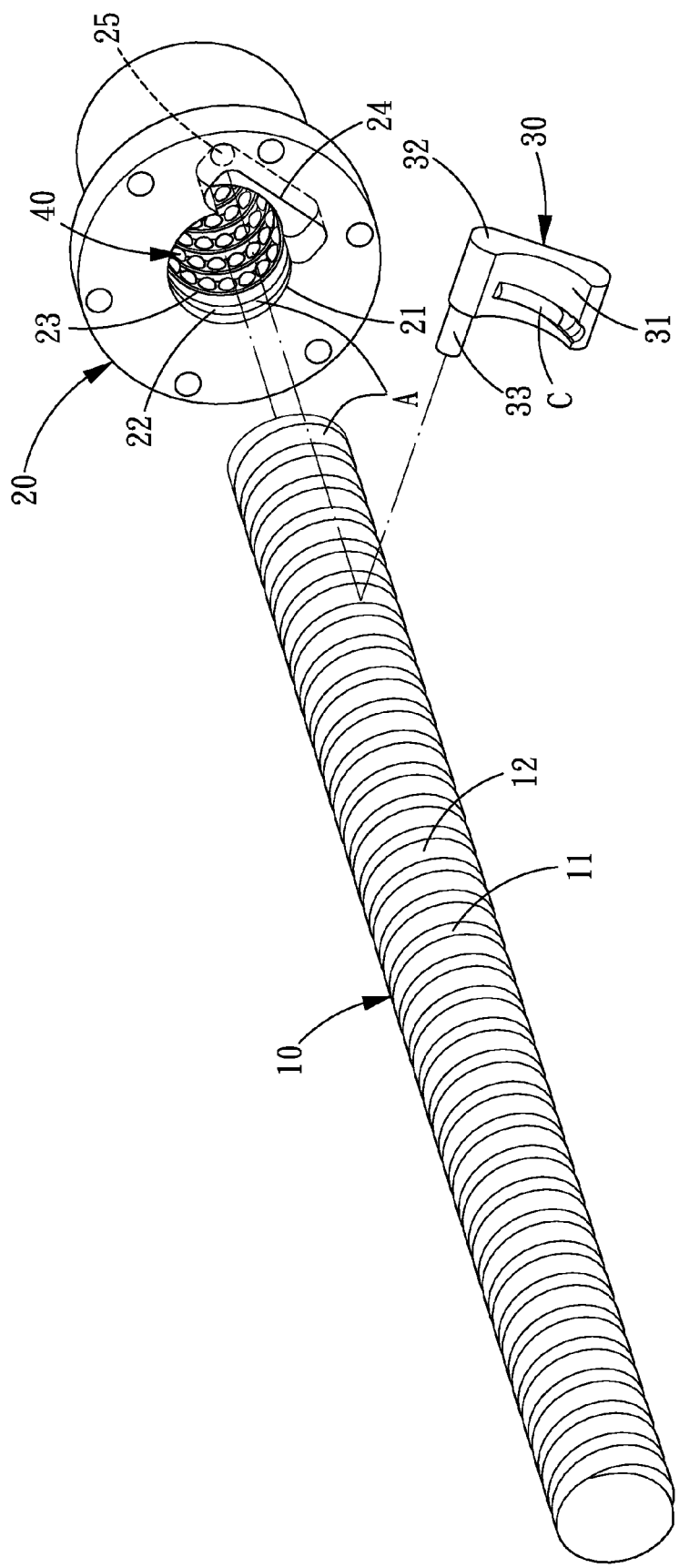
FIG. 2 is an exploded view of the ball screw in accordance with the present invention.
Figure 3A:
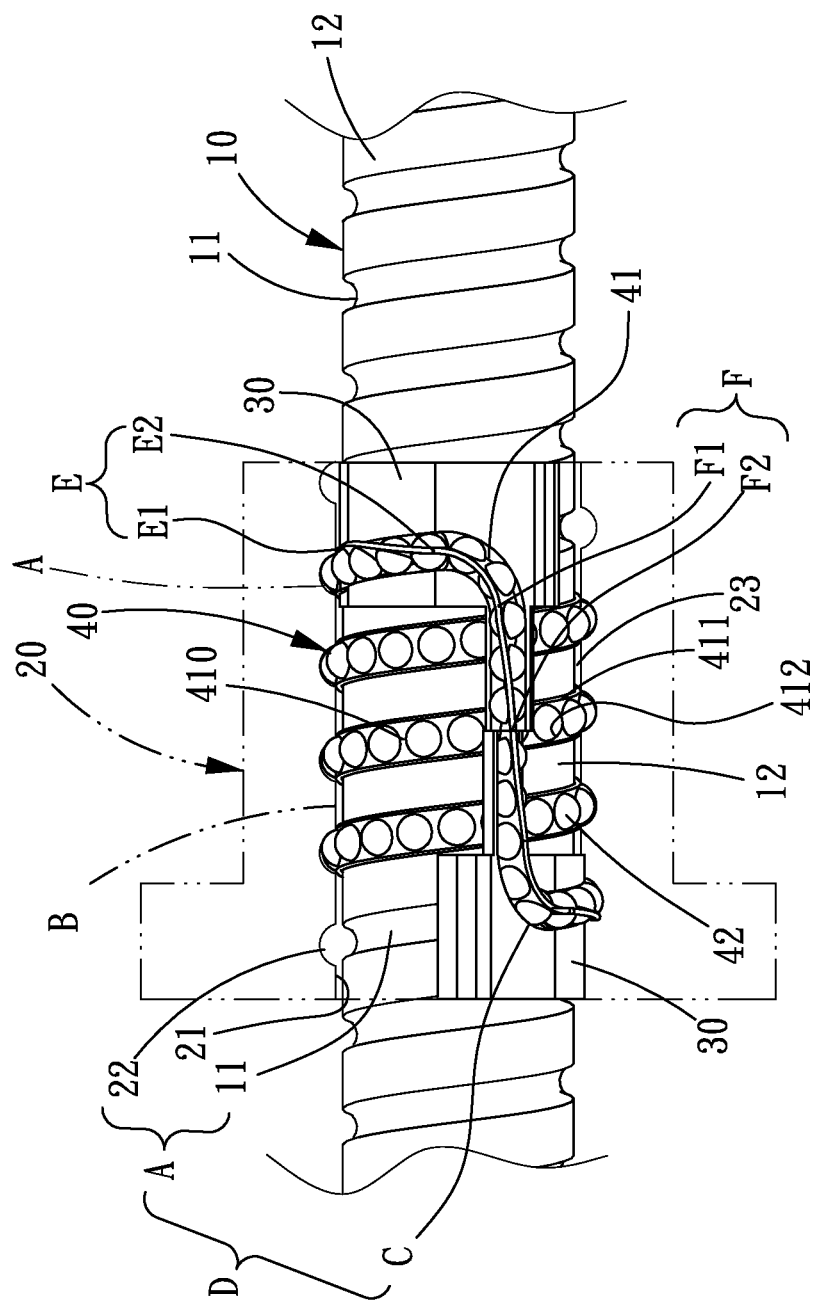
FIG. 3a is a front view illustrating how the screw cooperates with the return assemblies to allow for passage of the rolling assembly in accordance with the present invention.
Figure 3B:
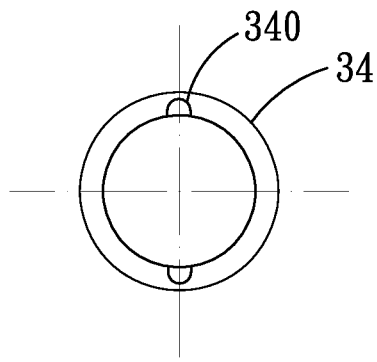
FIG. 3b is a cross sectional view showing the guiding grooves at the first point E1.
Figure 3C:
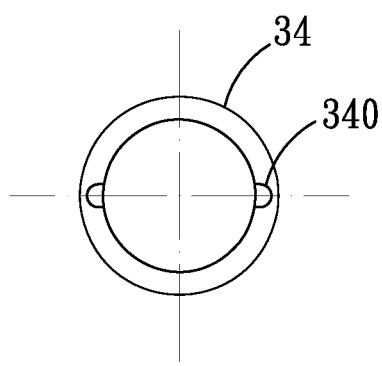
FIG. 3c is a cross sectional view showing the guiding grooves at the first point E2.
Figure 3D:
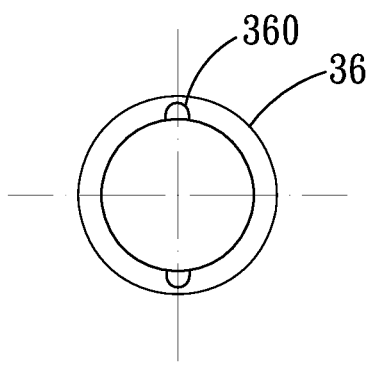
FIG. 3d is a cross sectional view showing the guiding grooves at the first point F1.
Figure 3E:
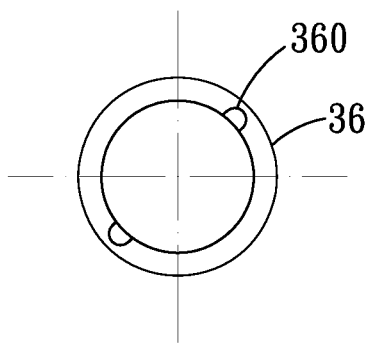
FIG. 3e is a cross sectional view showing the guiding grooves at the first point F2.

Referring to FIGS. 1, 2 and 3a, a return structure for a ball screw with a chain type rolling assembly in accordance with the present invention is shown, wherein the ball screw comprises a screw 10, a nut 20, two return assemblies 30 and a rolling assembly 40.

The screw 10 is provided with a screw helical rolling groove 11 in an outer circumferential surface thereof and a screw thread 12 defined by the screw helical rolling groove 11.

The nut 20 is provided with an insertion hole 21 for insertion of the screw 10, and the insertion hole 21 is provided with a nut helical rolling groove 22 in its inner circumferential surface opposite the screw helical rolling groove 11, and a nut thread 23 defined by the nut helical rolling groove 22. The screw rolling groove 11 and the nut rolling groove 22 cooperate with each to define a loaded path A. The nut 20 is provided with a receiving groove 24 in each of two opposite ends thereof and a rolling passage 25 between the two receiving grooves 24. The receiving grooves 24 are connected to the loaded path A, respectively.

Figure 4:
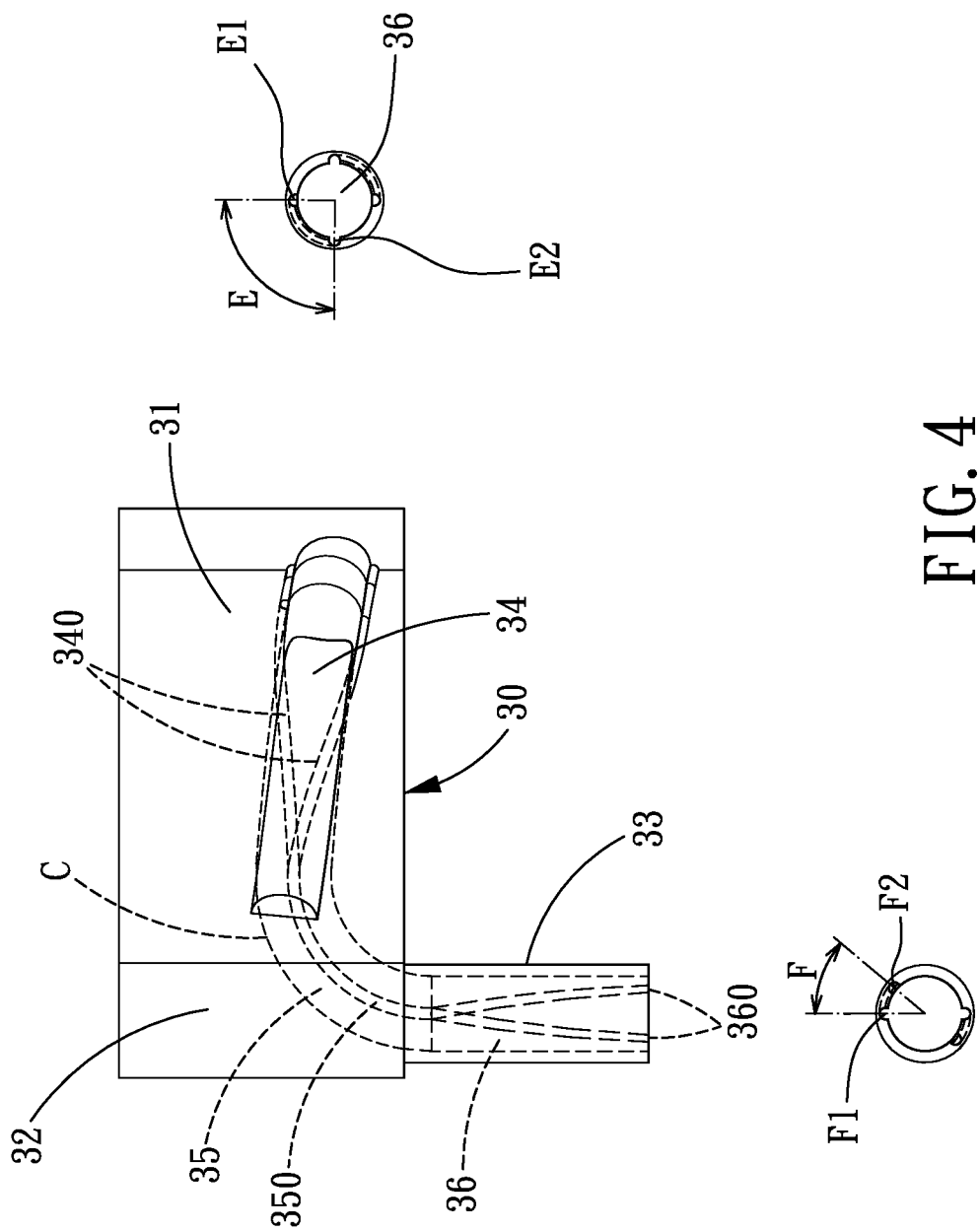
FIG. 4 is a front view of the return assembly in accordance with the present invention.
Figure 5:
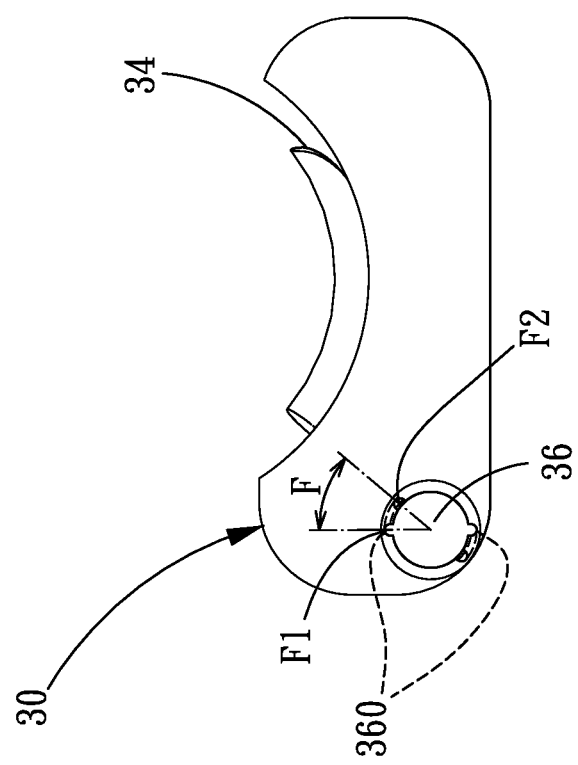
FIG. 5 is a side view of the return assembly in accordance with the present invention.

The two return assemblies 30 are disposed in the receiving grooves 24, respectively. As shown in FIGS. 3a and 4, each of the return assemblies 30 is provided with a linking portion 31, a return portion 32 and a connecting portion 33 in order. Each of the return assemblies 30 is further defined with a linking portion passage 34, a return portion passage 35 and a connecting portion passage 36 in the linking portion 31, the return portion 32 and the connecting portion 33, respectively. One end of the linking portion passage 34 is linked up with the loaded path A, and both ends of the return portion passage 35 are connected to the other end of the linking portion passage 34 and one end of the connecting portion passage 36, thus defining a return passage C. The other end of the connecting portion passage 36 is connected to the rolling passage 25. Each of the linking portion passage 34, the return portion passage 35 and the connecting portion passage 36 is defined with two guiding grooves 340, 350, 360 in the return passage C. The return passage C is linked up with the loaded path A to form a complete circulation path D.

The rolling assembly 40 includes a chain 41 and plural rolling elements 42. As shown in FIG. 3a, the chain 41 includes plural spacers 410 and two linking portions 411 that are linked together. Each pair of neighboring spacers 410 defines an accommodation space 412 for a rolling element 42. The linking portions 411 are slidably disposed in the guiding grooves 340, 350 and 360 for guiding the movement of the linking portions 411 of the chain 41.

Referring to FIGS. 3a-3e, 4 and 5, the one end of the linking portion passage 34, which is connected with the loaded path A, is designated as a first point E1, and another end of the linking portion passage 34, which is connected with the return portion passage 35, is designated as a second point E2. The guiding grooves 340 between the first and second points E1, E2 of the linking portion passage 34 are twisted a first angle E, and the first angle ranges from 80 to 100 degrees, and is preferably 90 degrees.

The one end of the connecting portion passage 36, which is connected with the return portion passage 35, is designated as a first point F1, and the other end of the connecting portion passage 36, which is linked up with the other return assembly 30, is designated as a second point F2. The guiding grooves 360 between the first and second points F1, F2 of the connecting portion passage 36 are twisted a second angle F, and the second angle F ranges from 30 to 60 degrees, and is preferably 45 degrees.

Figure 6:
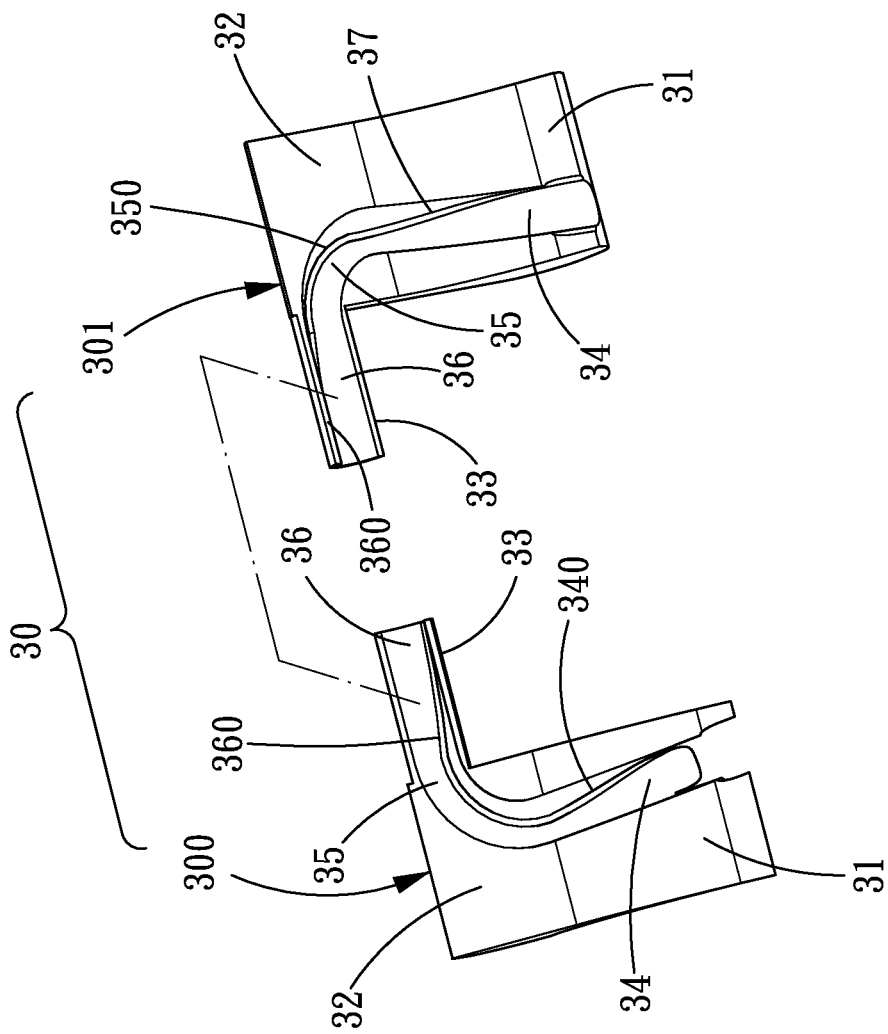
FIG. 6 is an exploded view of the two return elements of the return assembly in accordance with the present invention.

Each of the return assemblies 30 includes a first return element 300 and a second return element 301 that are oppositely combined together, as shown in FIG. 6.

Figure 7:
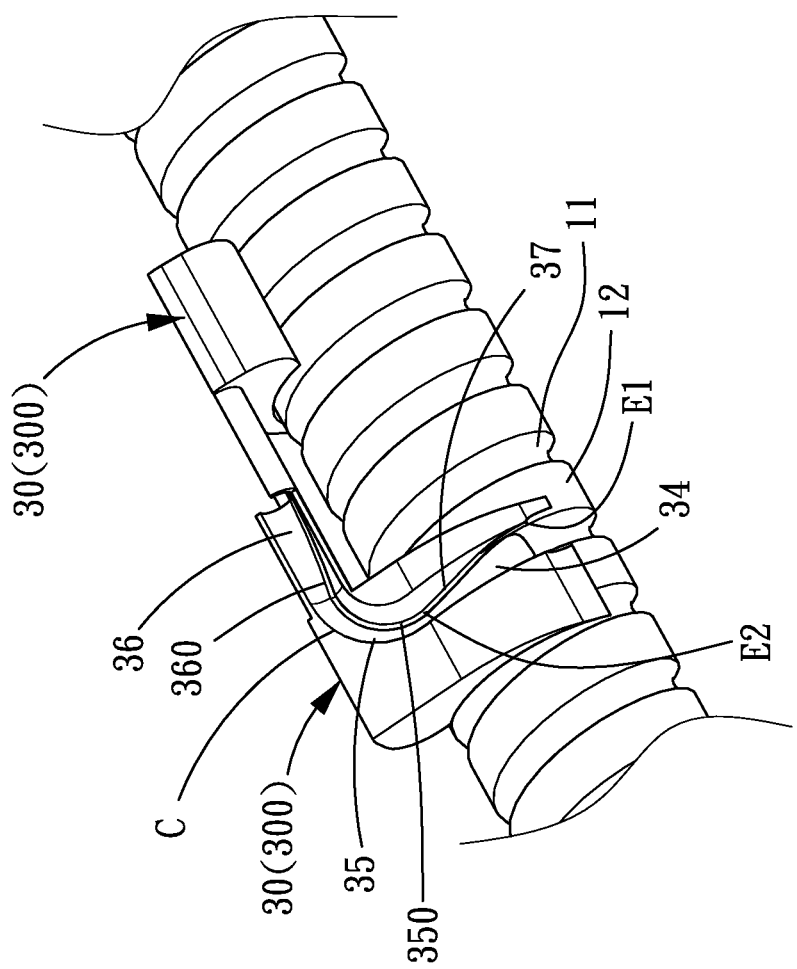
FIG. 7 is a perspective view illustrating how the screw cooperates with the first return elements of the two return assemblies in accordance with the present invention.
Figure 8:
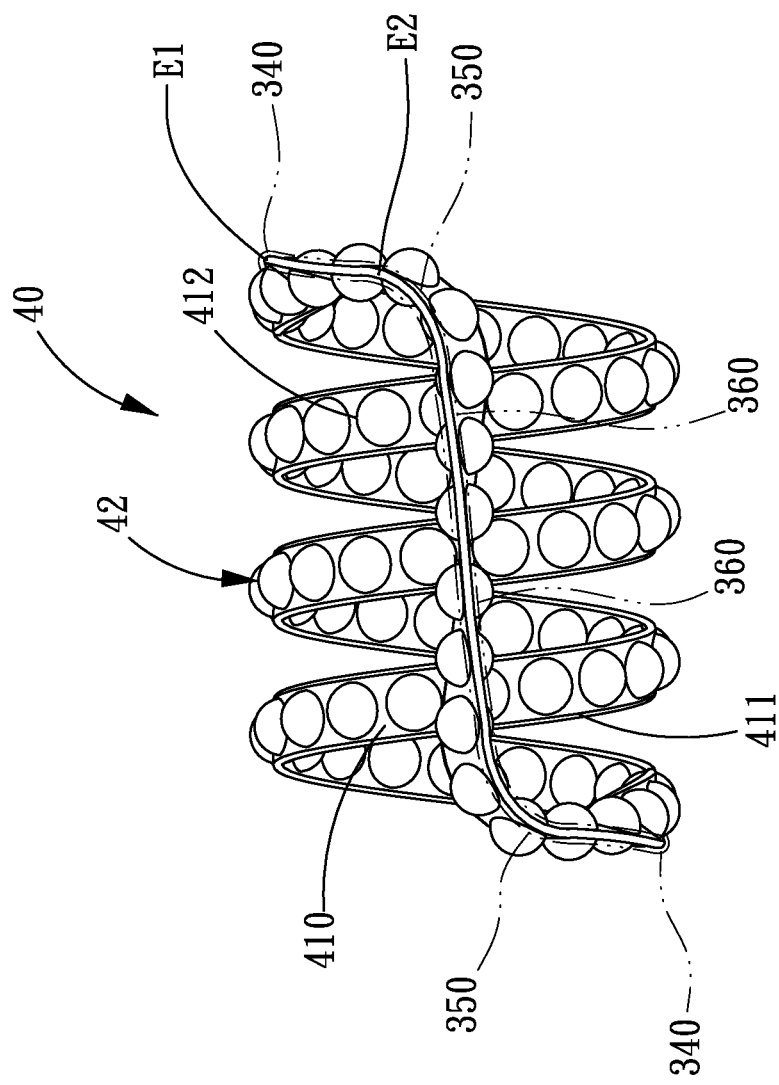
FIG. 8 is a perspective view illustrating how the rolling assembly twists along the return passage in accordance with the present invention.
Figure 9:
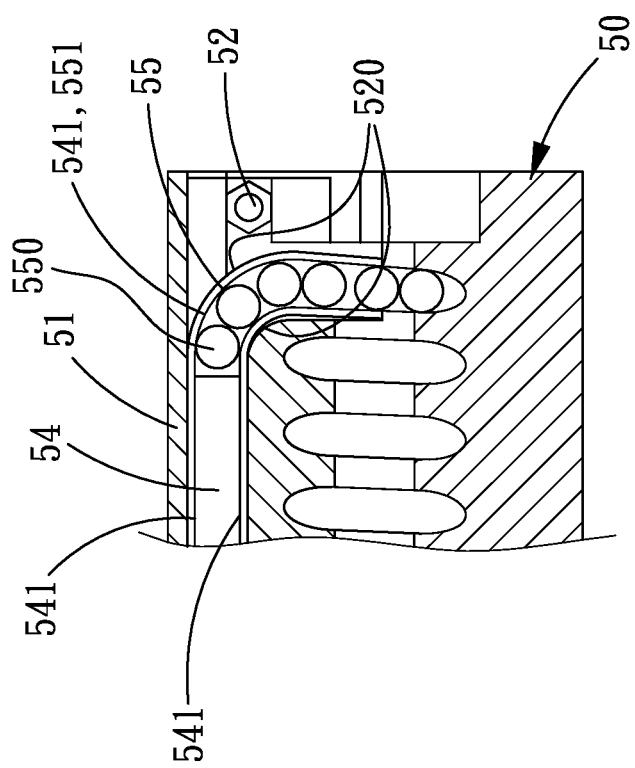
FIG. 9 is a plane view of a circulation path of a conventional ball screw.
Figure 10:
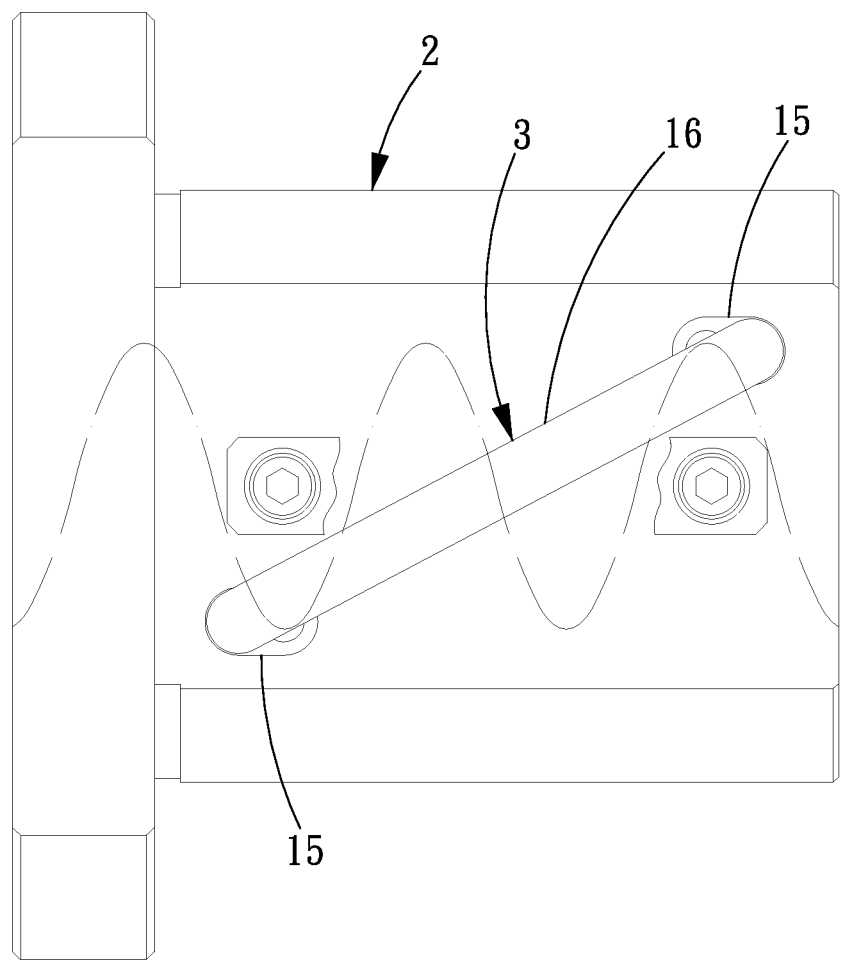
FIG. 10 is a perspective view showing a conventional chain-type ball screw with return structure.
Figure 11:
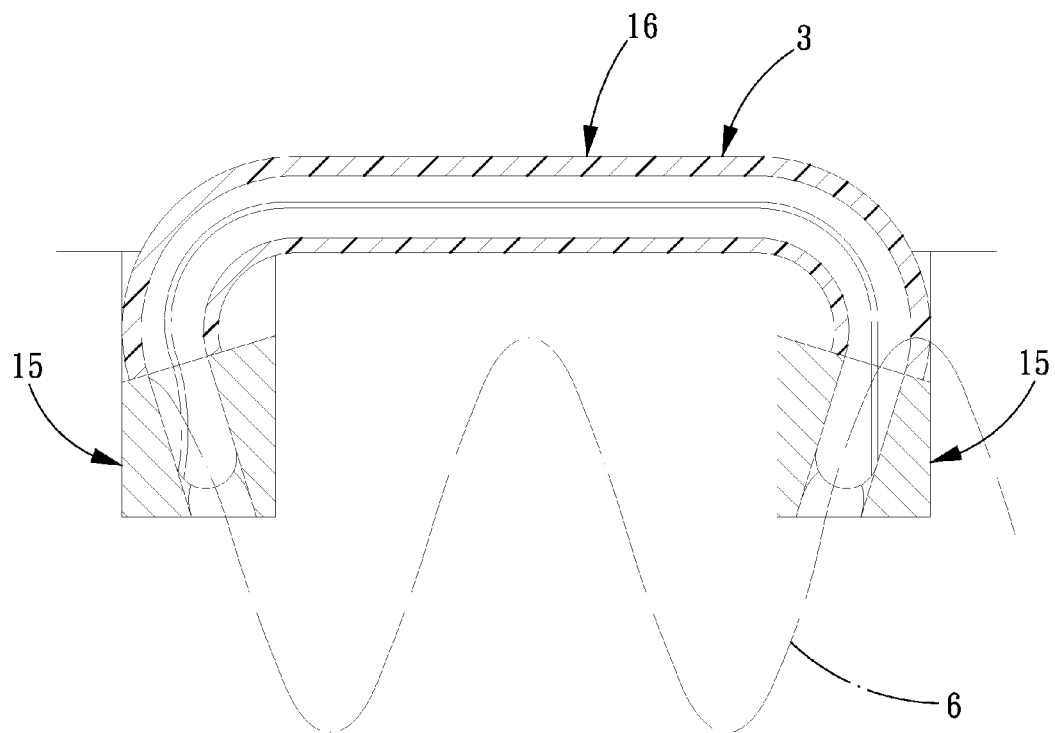
FIG. 11 is a cross sectional view of the conventional chain-type ball screw with return structure.
Figure 12:
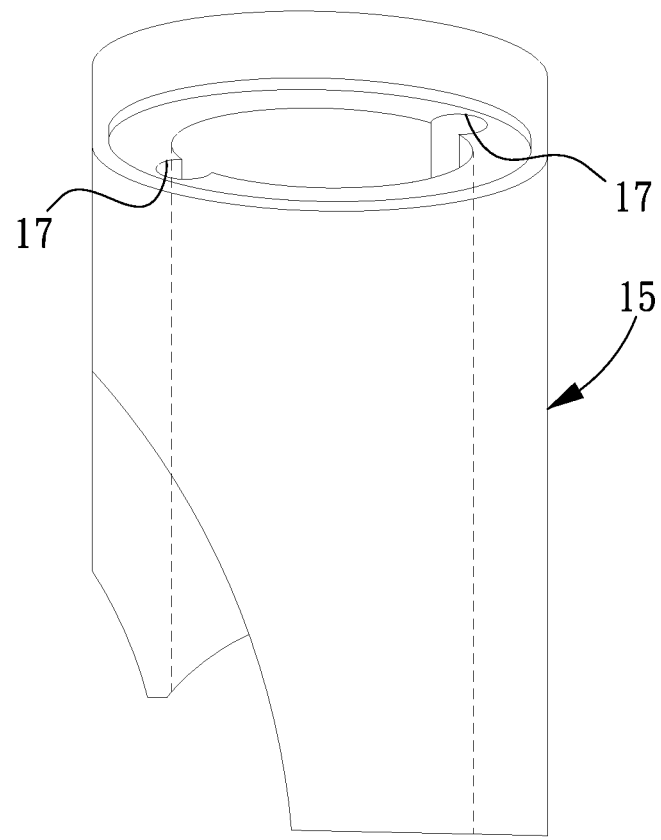
FIG. 12 is another perspective view showing the return structure of the conventional chain-type ball screw.

Referring to FIGS. 7-8, when the rolling assembly 40 moves within the linking portion passage 34, the linking portions 411 will be guided to move by the guiding grooves 340 from the first point E1 to the second point E2 of the linking portion passage 34, thus twisting an angle of about 90 degrees that is the first angle. After passing through the return portion passage 35 to the connecting portion passage 36, the rolling assembly 40 will move from the first point F1 to the second point F2 of the guiding grooves 360 of the connecting portion passage 36 and thus twist an angle of about 45 degrees that is the second angle. By such arrangements, a smooth recirculation is provided.

When the screw 10 rotates, the rolling assembly 40 will be synchronously driven to roll within the circulation path D, thus driving the nut 20 to linearly move on the screw 10. Further, when the rolling assembly 40 rolls to the distal end of the loaded path A, namely entering one of the return assemblies 30, the rolling assembly 40 will enter one end of the return passage C of the one of the return assemblies 30 and then roll out of the other of the return assemblies 30 to return to the start end of the loaded path A to complete the circulation within the circulation path D. When rolling at the one of the return assemblies 30, the rolling assembly 40 will enter the guiding grooves 340, 350, 360, and twist the first angle E within the linking portion passage 34 to the optimal bending direction, and then the rolling assembly 40 will smoothly pass through the return portion passage 35 to the connecting portion passage 36. After that, the rolling assembly 40 will twist the second angle F within the connecting portion passage 36 and then enter the other of the return assemblies 30. Subsequently, the rolling assembly 40 will also twist the second angle F within the connecting portion passage 36 of the other of the return assemblies 30 and then pass through the return portion passage 35 to the linking portion passage 34, and finally the rolling assembly 40 will also twist the first angle E within the linking portion passage 34 and then return to the loaded path, thus completing a circulation.

Based on a further analysis of the structure of the preferred embodiment of the present invention, it can be found that the present invention has the following advantages:

1. Avoiding improper bending failure: when the rolling assembly 40 is rolling within the circulation path defined by the screw 10, the nut 20 and the two return assemblies 30, the rolling assembly 40 will twist the first angle E within the linking portion passage 34 of the return passage C of one of the return assemblies 30 through the guiding of the guiding grooves 340, and then the rolling assembly 40 will bend in the bendable direction to smoothly pass through the return portion passage 35, thus avoiding the serious deformation to avoid improper bending failure.

2. Reducing interference and improper collision: since the guiding grooves 350 of the return portion passage 35 is provided to make the rolling assembly 40 avoid passing the arc routes defined by the smallest and biggest radius of the return portion passage 35, the linking portions 411 of the rolling assembly 40 can bend in the bendable direction, therefore, the linking portions 411 at the two sides of the rolling assembly 40 will share the load evenly to be synchronously stretched and extruded, thus avoiding the improper deformation of the overall rolling assembly 40, and the rolling elements 42 will be kept rolling along the optimal path, thus avoiding the improper collision and interference with the return passage C and the return elements to reduce the integral damage and the noise to the lowest.

3. Continuous guiding to form a complete recirculation: besides the above guiding design, the rolling assembly 40 further utilizes the first angle E design and the second angle F design to twist within the two return assemblies 30 to make the linking portions 411 to bend in the bendable direction to avoid bending excessively within the serious deformation zone, thus forming a complete recirculation path to reduce the interference to the lowest for making the rolling assembly 40 roll within the return passage C more smoothly.

While we have shown and described various embodiments in accordance with the present invention, it is clear to those skilled in the art that further embodiments may be made without departing from the scope of the present invention.

What is claimed is:

1. A return structure for a ball screw with a chain type rolling assembly comprising two return assemblies disposed in a receiving groove formed at each of two ends of a nut, the nut being provided with a rolling passage between the two receiving grooves for connecting a loaded path formed by a screw helical rolling groove of the screw and a nut helical rolling groove of the nut, each of the return assemblies being provided with a linking portion, a return portion and a connecting portion in order and further defined with a linking portion passage, a return portion passage and a connecting portion passage in the linking portion, the return portion and the connecting portion, respectively, the linking portion passage linked up with the loaded path, and both ends of the return portion passage being connected to the linking portion passage and the connecting portion passage, thus defining a return passage, the other end of the connecting portion passage being connected to the rolling passage, two guiding grooves being formed in the return passage;

wherein one end of the linking portion passage which is connected with the loaded path is designated as a first point, and another end of the linking portion passage which is connected with the return portion passage, is designated as a second point, the guiding grooves between the first and second points of the linking portion passage of the return passage are twisted a first angle, and the first angle ranges from 80 to 100 degrees, and one end of the connecting portion passage which is connected with the return portion passage is designated as a first point, and another end of the connecting portion passage is designated as a second point, the guiding grooves between the first and second points of the connecting portion passage are twisted a second angle of 30 to 60 degrees;

the return portion passage of each of the return assemblies does not twist, and the connecting portion passages of the two return assemblies twist in the same direction.

2. The return structure for a ball screw with a chain type rolling assembly as claimed in claim 1, wherein the first angle is 90 degrees.

3. The return structure for a ball screw with a chain type rolling assembly as claimed in claim 1, wherein the second angle is 45 degrees.

* * * * *